United States Patent
Hsu et al.

(10) Patent No.: US 10,019,039 B1
(45) Date of Patent: Jul. 10, 2018

(54) CLAMSHELL-TYPE ELECTRONIC DEVICE AND DUAL-AXIS HINGE MODULE THEREOF

(71) Applicant: FIRST DOME CORPORATION, New Taipei (TW)

(72) Inventors: An-Szu Hsu, New Taipei (TW); Zhu-Ping Hong, New Taipei (TW); Yu-Jiao Ming, New Taipei (TW)

(73) Assignee: FIRST DOME CORPORATION, New Taipei (TW)

( * ) Notice: Subject to any disclaimer, the term of this patent is extended or adjusted under 35 U.S.C. 154(b) by 0 days.

(21) Appl. No.: 15/627,386

(22) Filed: Jun. 19, 2017

(51) Int. Cl.
*G06F 1/16* (2006.01)
*G06F 1/20* (2006.01)
*E05D 3/12* (2006.01)
*E05D 11/08* (2006.01)

(52) U.S. Cl.
CPC ........... *G06F 1/1681* (2013.01); *E05D 3/122* (2013.01); *E05D 11/082* (2013.01); *G06F 1/1616* (2013.01); *G06F 1/203* (2013.01); *E05Y 2900/606* (2013.01); *G06F 1/1637* (2013.01); *G06F 1/1662* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,640,044 B2* | 12/2009 | Won | | G06F 1/1618 |
| | | | | 348/333.06 |
| 8,385,991 B2* | 2/2013 | Wang | | E05D 3/18 |
| | | | | 16/221 |
| 8,578,561 B2* | 11/2013 | Chuang | | G06F 1/1681 |
| | | | | 16/354 |
| 8,938,855 B2* | 1/2015 | Ahn | | F16C 11/04 |
| | | | | 16/354 |
| 9,009,919 B1* | 4/2015 | Chiang | | G06F 1/1681 |
| | | | | 16/303 |
| 9,274,552 B2* | 3/2016 | Ahn | | G06F 1/1641 |
| 2012/0309470 A1* | 12/2012 | Park | | G06F 1/1681 |
| | | | | 455/575.3 |
| 2014/0009874 A1* | 1/2014 | Huang | | G06F 1/162 |
| | | | | 361/679.01 |
| 2015/0309539 A1* | 10/2015 | Kamphuis | | G06F 1/1681 |
| | | | | 361/679.27 |

* cited by examiner

*Primary Examiner* — Lisa Lea Edmonds
(74) *Attorney, Agent, or Firm* — Li & Cai Intellectual Property (USA) Office

(57) ABSTRACT

A clamshell-type electronic device includes a dual-axis hinge module, a first electronic module, and a second electronic module, the latter two of which are electrically connected to each other. The dual-axis hinge module includes a fixing shaft, a moving shaft parallel to and engaged with the fixing shaft, a moving frame fastened to the fixing shaft and the moving shaft, a torsion structure fixed on the moving shaft, and a fixing frame. No torsion structure is disposed on the fixing shaft. The moving frame is fixed on the first electronic module. The fixing frame has a connecting portion fixed on the fixing shaft and a mounting portion fixed on the second electronic module. The moving shaft can be rotated along the fixing shaft and can be synchronously spun, so that a distance between the moving shaft and the mounting portion can be changed.

10 Claims, 14 Drawing Sheets

CLAMSHELL-TYPE ELECTRONIC DEVICE AND DUAL-AXIS HINGE MODULE THEREOF

BACKGROUND OF THE INVENTION

1. Field of the Invention

The present disclosure relates to a clamshell-type electronic device; in particular, to a clamshell-type electronic device and a dual-axis hinge module thereof without providing any torsion structure on a fixing shaft thereof.

2. Description of Related Art

A conventional clamshell-type electronic device (e.g., a notebook PC) includes a keyboard module, a display module pivotally connected to the keyboard module, and a torsion structure installed in the unrotated keyboard module to provide torsion for the rotation of the display module. Accordingly, the keyboard module of the conventional clamshell-type electronic device has a structural limitation, because the keyboard module needs to accommodate the torsion structure. For example, the maximum thickness of the keyboard module must be larger than that of the torsion structure.

SUMMARY OF THE INVENTION

The present disclosure provides a clamshell-type electronic device and a dual-axis hinge module thereof to solve the problem associated with conventional clamshell-type electronic devices.

The present disclosure discloses a clamshell-type electronic device including a dual-axis hinge module, a first electronic module, and a second electronic module, the latter two of which are electrically connected to each other. The dual-axis hinge module includes a fixing shaft, a moving shaft, a moving frame, and a fixing frame. The fixing shaft defines a first axis and has a first mating segment, and no torsion structure is disposed on the fixing shaft. The moving shaft defines a second axis parallel to the first axis. The moving shaft has a gear-shaped segment and a fastening segment, and the gear-shaped segment is engaged with the mating segment of the fixing shaft. The moving frame is fastened to the fixing shaft and the moving shaft. The torsion structure is fixed on the fastening segment of the moving shaft. The torsion structure is configured to provide torque when the moving shaft is spun along the second axis. The fixing frame has a connecting portion and a mounting portion. The fixing shaft is fixed on the connecting portion of the fixing frame. The moving frame is fixed on the first electronic module. The mounting portion of the fixing frame is fixed on the second electronic module. The first electronic module is rotatable relative to the second electronic module along the first axis between a first position and a second position. When the first electronic module is at the first position, the first electronic module is located adjacent to and faces the second electronic module. When the first electronic module is rotated from the first position to the second position, the moving shaft is rotated along the first axis and is synchronously spun along the second axis. A distance between the second axis and the mounting portion is variable and is defined as a variable distance, and the variable distance at the second position is larger than that at the first position.

The present disclosure also discloses a dual-axis hinge module of a clamshell-type electronic device. The dual-axis hinge module includes a fixing shaft, a moving shaft, a moving frame, and a fixing frame. The fixing shaft defines a first axis and has a first mating segment, and no torsion structure is disposed on the fixing shaft. The moving shaft defines a second axis parallel to the first axis. The moving shaft has a gear-shaped segment and a fastening segment, and the gear-shaped segment is engaged with the mating segment of the fixing shaft. The moving frame is fastened to the fixing shaft and the moving shaft. The torsion structure is fixed on the fastening segment of the moving shaft. The torsion structure is configured to provide torque when the moving shaft is spun along the second axis. The fixing frame has a connecting portion and a mounting portion. The fixing shaft is fixed on the connecting portion of the fixing frame. The rotating shaft is rotatable relative to the fixing shaft along the first axis between a first position and a second position. When the rotating shaft is rotated along the first axis, the rotating shaft is synchronously spun along the second axis. A distance between the second axis and the mounting portion is variable and is defined as a variable distance, and the variable distance at the second position is larger than that at the first position.

In summary, each of the clamshell-type electronic device and the dual-axis hinge module in the present disclosure adapts the torsion structure to be arranged in the first electronic module only, so that the structure design of the second electronic module is not limited to the torsion structure. Moreover, the distance between the second axis and the mounting portion at the second position is larger than that between the second axis and the mounting portion at the first position, so that the second electronic module, which has the heat-dissipating hole arranged adjacent to the mounting portion, can be provided with a good heat-dissipating efficiency.

In order to further appreciate the characteristics and technical contents of the present disclosure, references are hereunder made to the detailed descriptions and appended drawings in connection with the present disclosure. However, the appended drawings are merely shown for exemplary purposes, and should not be construed as restricting the scope of the present disclosure.

DETAILED DESCRIPTION OF THE PREFERRED EMBODIMENTS

References are hereunder made to the detailed descriptions and appended drawings in connection with the present disclosure. However, the appended drawings are merely provided for exemplary purposes, and should not be construed as restricting the scope of the present disclosure.

Figure 1:
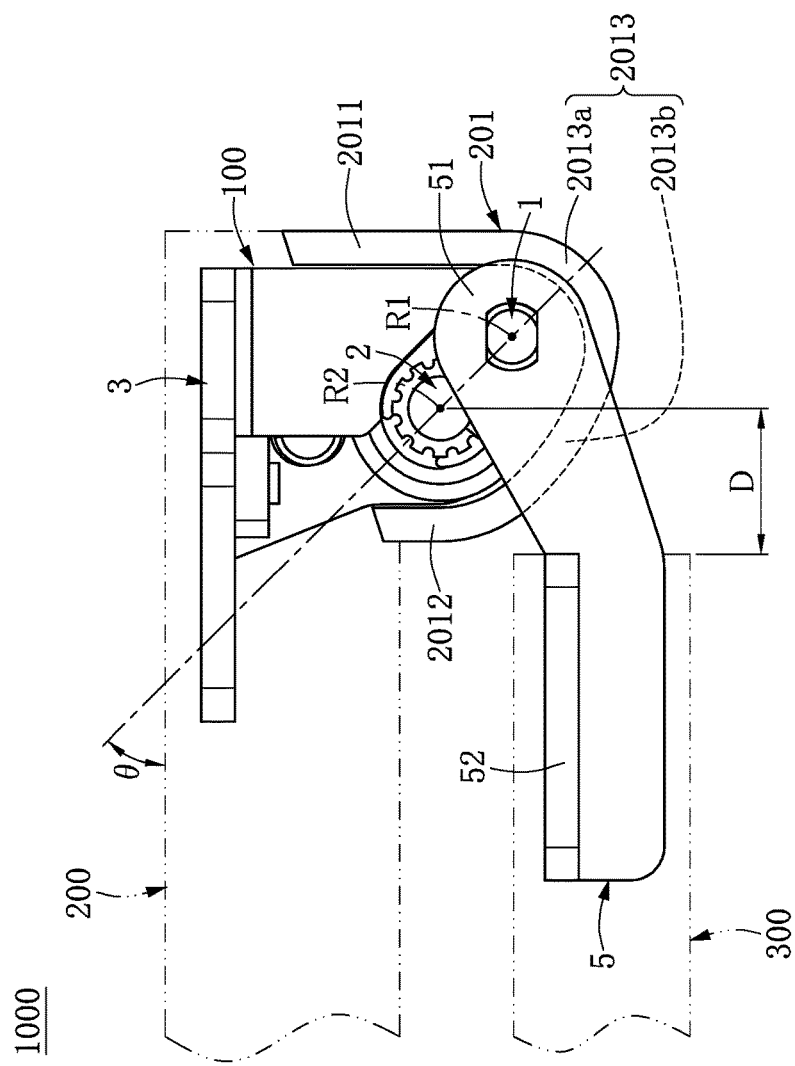
FIG. 1 is a planar view showing a clamshell-type electronic device according to a first embodiment of the present disclosure when a first electronic module is not rotated relative to a second electronic module.
Figure 2:
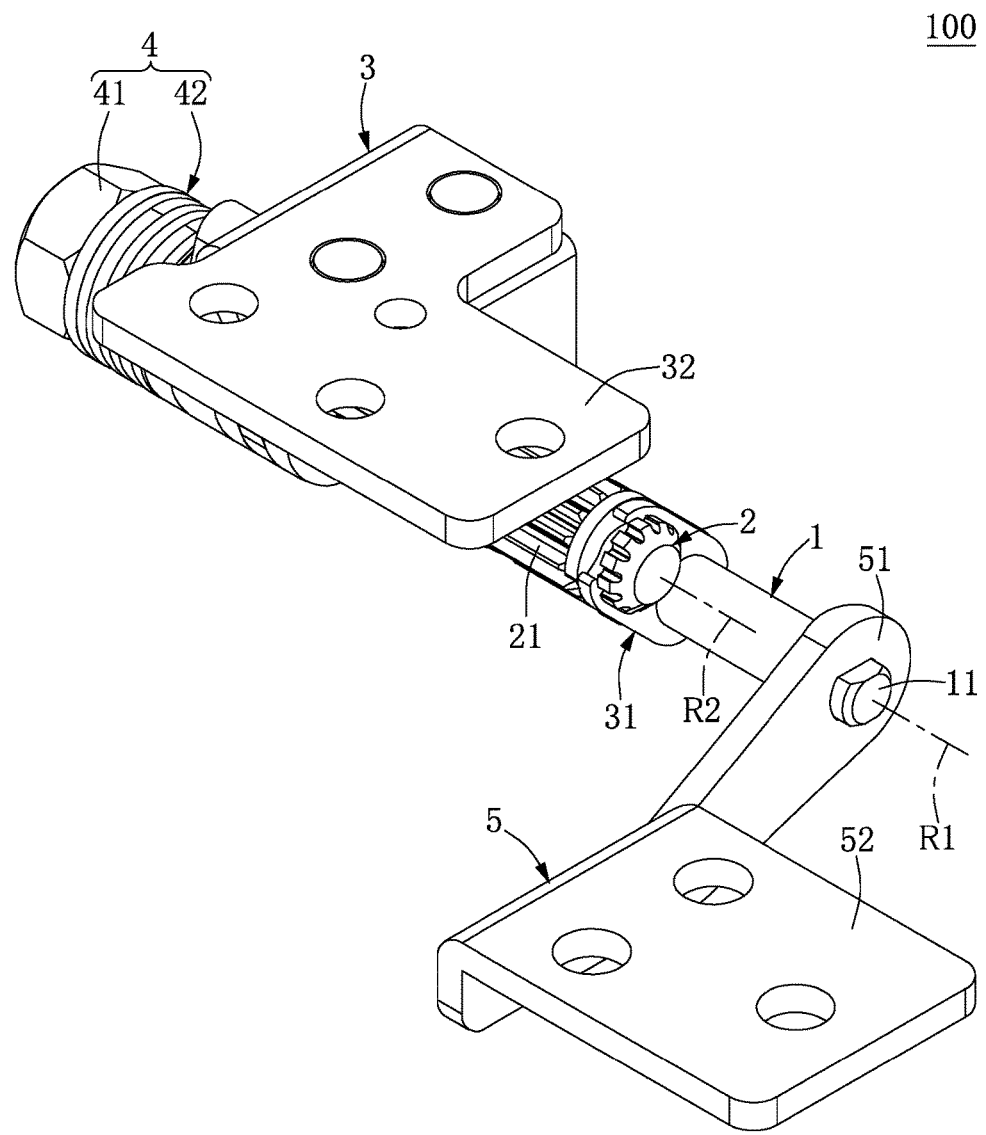
FIG. 2 is a perspective view showing a hinge module of FIG. 1.
Figure 3:
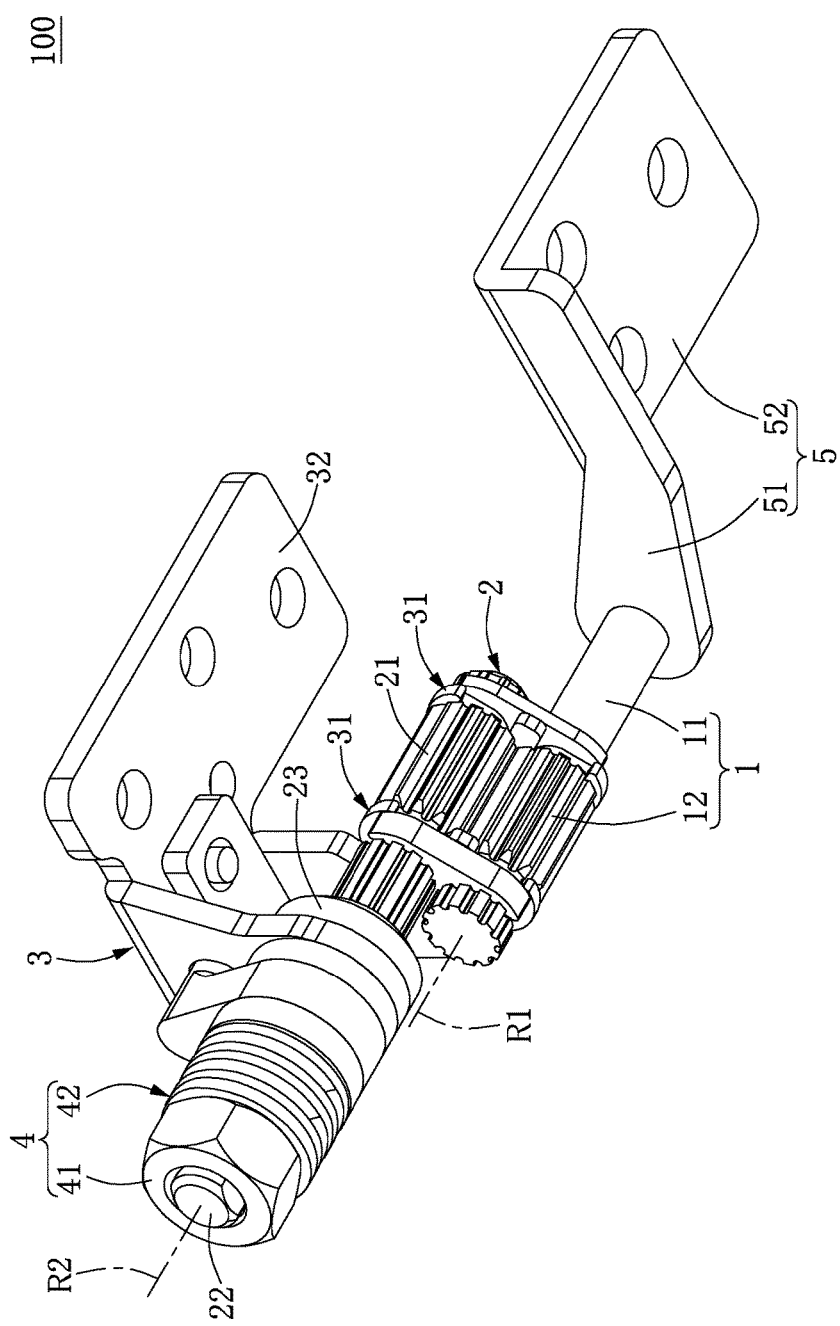
FIG. 3 is a perspective view showing the hinge module of FIG. 1 from another perspective.

Reference is made to FIGS. 1 to 14, which illustrate an embodiment of the present disclosure. As shown in FIGS. 1 to 3, the present embodiment discloses a clamshell-type electronic device 1000 including a dual-axis hinge module 100, a first electronic module 200, and a second electronic module 300. The dual-axis hinge module 100 is connected to the first electronic module 200 and the second electronic module 300 to provide a torque for the rotation of the first electronic module 200 relative to the second electronic module 300. The first electronic module 200 in the present embodiment is exemplified as a display module, and the second electronic module 300 is exemplified as a keyboard module, but the present disclosure is not limited thereto.

Moreover, the dual-axis hinge module 100 in the present embodiment includes a fixing shaft 1, a moving shaft 2, a moving frame 3, a torsion structure 4, and a fixing frame 5. The following description discloses the structure and connection relationships of each component of the dual-axis hinge module 100.

Figure 4:
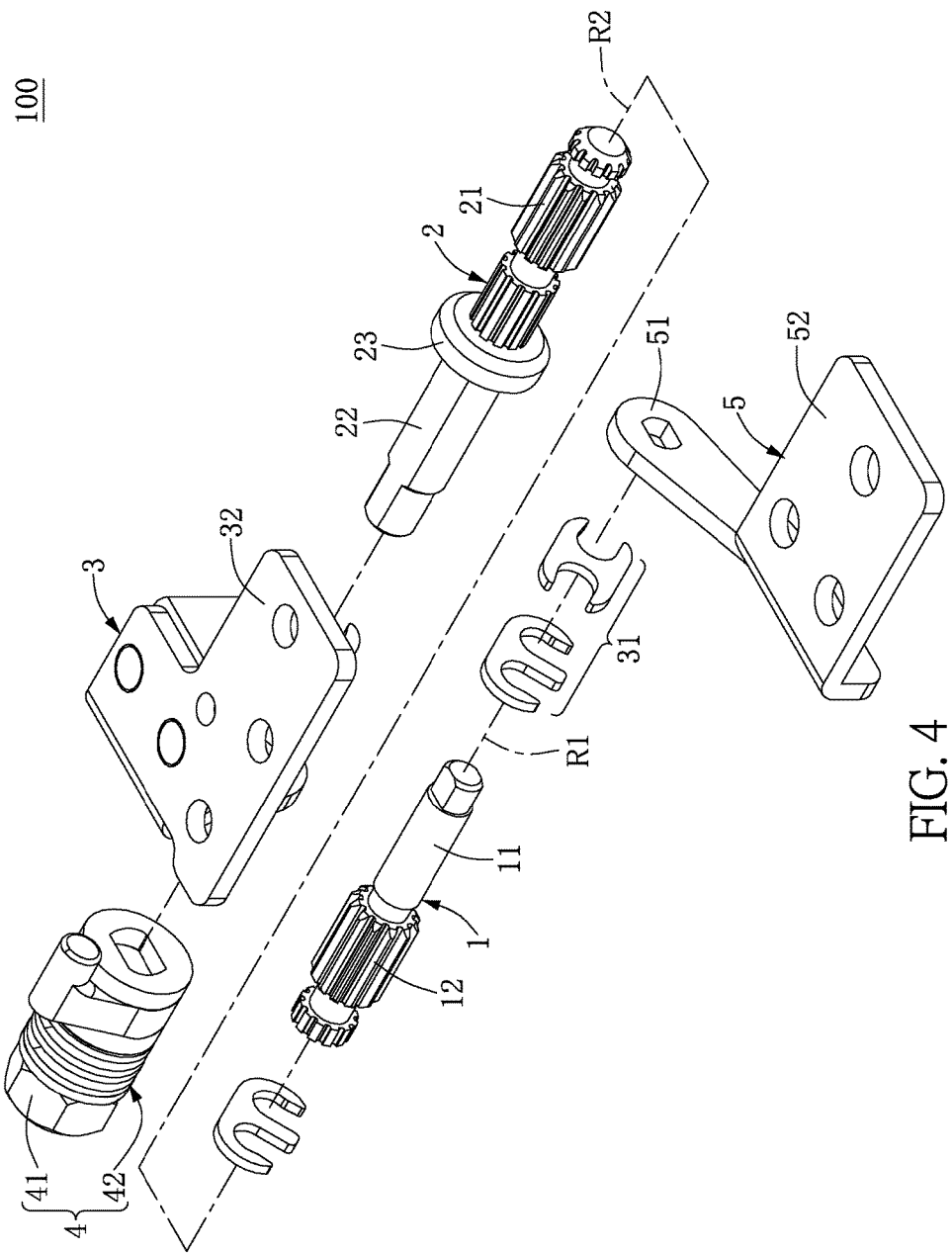
FIG. 4 is an exploded view of FIG. 2.
Figure 5:
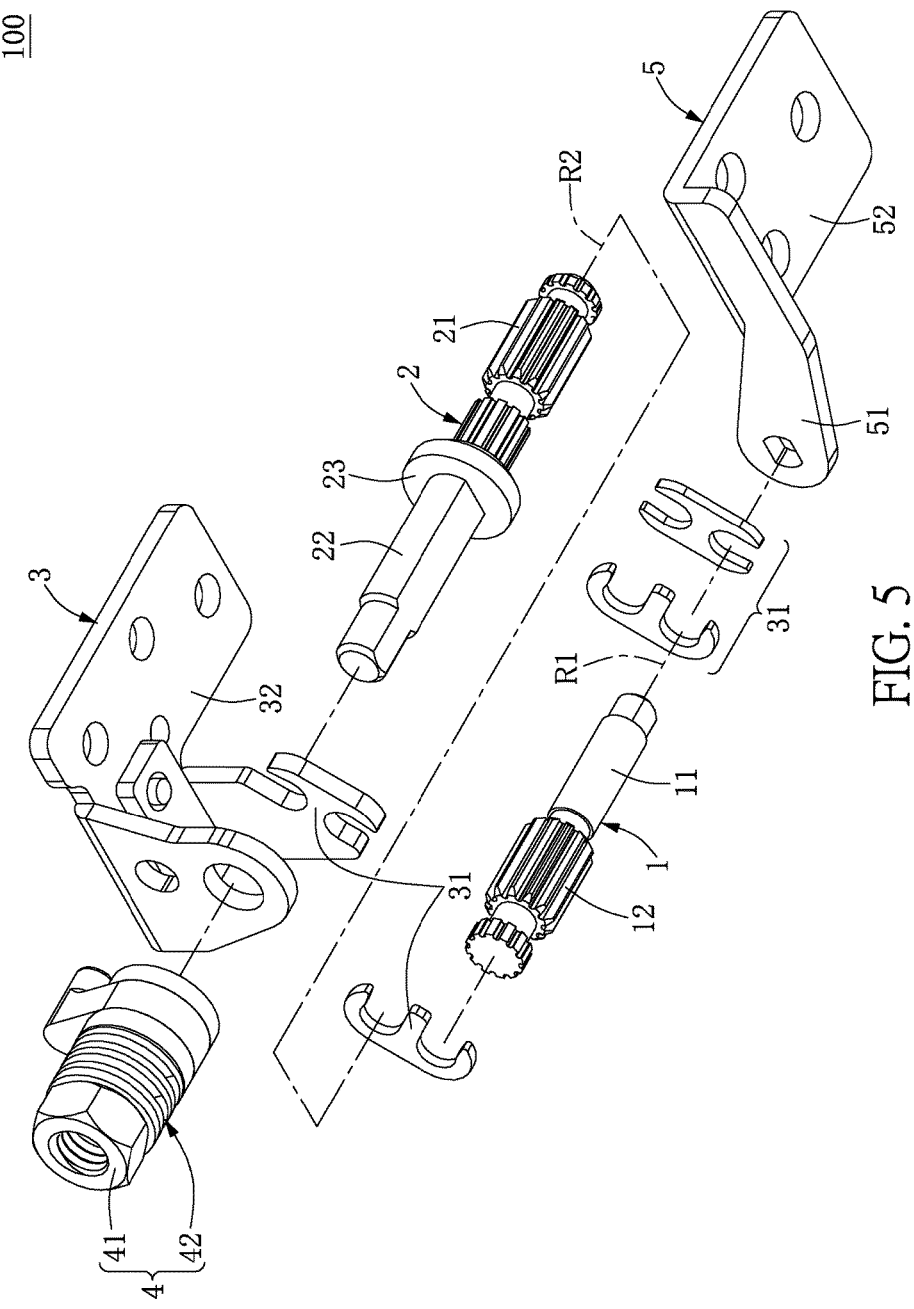
FIG. 5 is an exploded view of FIG. 3.
Figure 6:
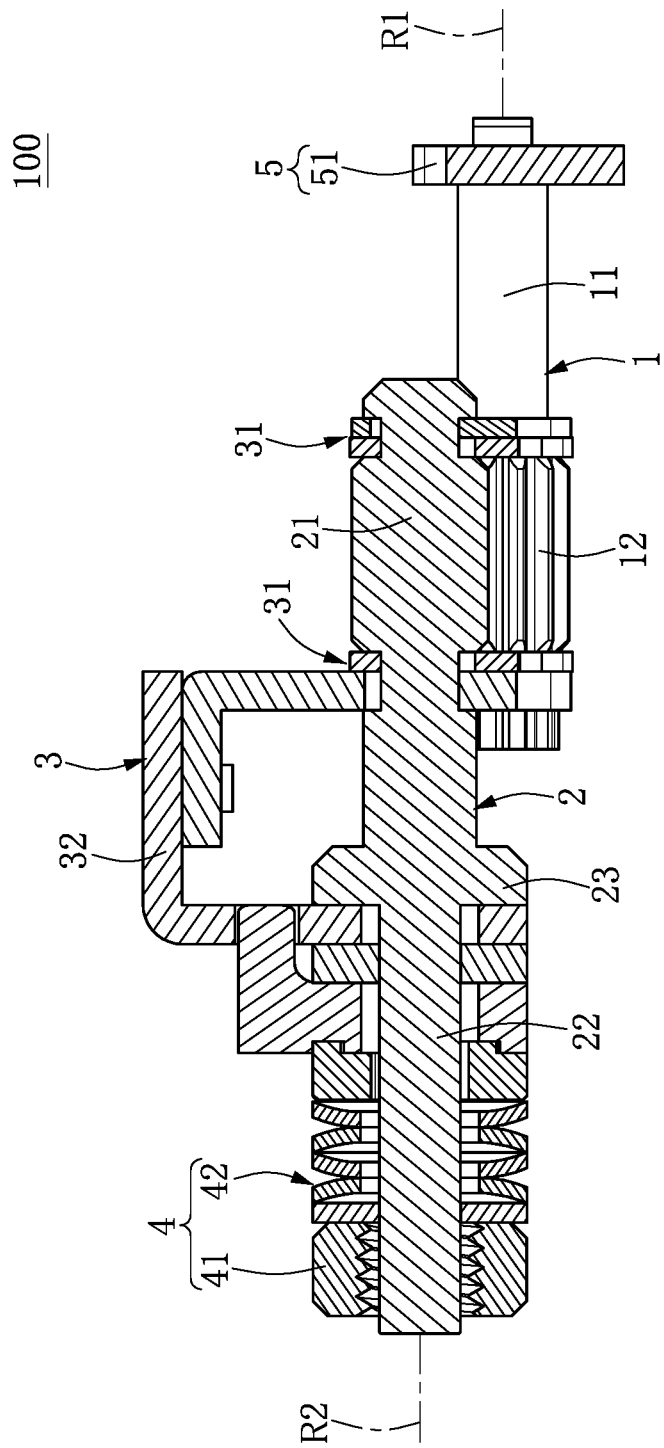
FIG. 6 is a cross-sectional view of FIG. 2.

As shown in FIGS. 4 to 6, a central axis of the fixing shaft 1 is defined as a first axis R1. The fixing shaft 1 has a connecting segment 11 and a mating segment 12. The mating segment 12 has a plurality of gear teeth circularly arranged on an outer portion thereof, and the gear teeth of the mating segment 12 can be integrally formed on or detachably fastened to the fixing shaft 1. Moreover, in the present embodiment, no torsion structure is disposed on the fixing shaft 1 to provide torque.

A central axis of the moving shaft 2 is defined as a second axis R2. The moving shaft 2 has a gear-shaped segment 21, a fastening segment 22, and a blocking segment 23 arranged between the gear-shaped segment 21 and the fastening segment 22. The gear-shaped segment 21 has a plurality of gear teeth circularly arranged on an outer portion thereof, and the gear teeth of the gear-shaped segment 21 can be integrally formed on or detachably fastened to the moving shaft 2. An outer diameter of the blocking segment 23 is larger than that of the fastening segment 22, and is also larger than that of the gear-shaped segment 21. Any cross-section of the fastening segment 22, which is perpendicular to the second axis R2, has a non-circle shape.

Moreover, the second axis R2 is substantially parallel to the first axis R1. The gear-shaped segment 21 of the moving shaft 2 is engaged with the mating segment 12 of the fixing shaft 1. The fastening segment 22 and the connecting segment 11 are respectively arranged at two opposite sides of the engaged portion of the fixing shaft 1 and the moving shaft 2 (i.e., the left and right sides of the gear-shaped segment 21 and the mating segment 12 as shown in FIG. 3).

The moving frame 3 is fastened to the fixing shaft 1 and the moving shaft 2 to maintain the engagement between the gear-shaped segment 21 of the moving shaft 2 and the mating segment 12 of the fixing shaft 1, and the moving frame 3 is configured to allow the gear-shaped segment 21 rotating relative to the mating segment 12. Specifically, the moving frame 3 includes two positioning portions 31 and a fixing portion 32. Each of the two positioning portions 31 includes two sheets (i.e., as shown in FIG. 5, the left two sheets are defined as one of the two positioning portions 31, and the right two sheets are defined as the other positioning portion 31), and at least one of the sheets of the two positioning portions 31 is perpendicularly connected to the fixing portion 32. Each of the two positioning portions 31 is fixed on the fixing shaft 1 and the moving shaft 2, and the two positioning portions 31 are respectively arranged on two opposite sides of the engaged portion of the fixing shaft 1 and the moving shaft 2, so that the engagement between the gear-shaped segment 21 of the moving shaft 2 and the mating segment 12 of the fixing shaft 1 can be maintained, and the rotation of the gear-shaped segment 21 relative to the mating segment 12 can be implemented. In the present embodiment, the two sheets of each of the two positioning portions 31 are configured to limit the fixing shaft 1 and the moving shaft 2 in different directions, but the present disclosure is not limited thereto.

The torsion structure 4 is fixed on (i.e., sleeved on) the fastening segment 22 of the moving shaft 2. The torsion structure 4 is configured to provide torque when the moving shaft 2 is spun along the second axis R2, and the fixing shaft 1 and the moving shaft 2 can transfer the torque by using the engagement between the mating segment 12 and the gear-shaped segment 21. Specifically, the torsion structure 4 in the present embodiment includes a nut 41 and a washer assembly 42. The fastening segment 22 of the moving shaft 2 couples through the washer assembly 42 and the nut 41, and the washer assembly 42 is arranged between the nut 41 and the blocking segment 23, but the present disclosure is not limited thereto.

The fixing frame 5 has a connecting portion 51 and a mounting portion 52. The connecting segment 11 of the fixing shaft 1 is inserted into and fixed on the connecting portion 51 of the fixing frame 5, and the fixing shaft 1 cannot be rotated relative to the fixing frame 5. A distance between the central axis of the moving shaft 2 (i.e., the second axis R2) and the mounting portion 52 is variable and is defined as a variable distance D (as shown in FIG. 1).

As shown in FIG. 1 and FIGS. 4 to 6, the first electronic module 200 and the second electronic module 300 are electrically connected to each other. The fixing portion 32 of the moving frame 3 is fixed on the first electronic module 200, and the mounting portion 52 of the fixing frame 5 is fixed on the second electronic module 300. The first axis R1 and the second axis R2 jointly co-define a plane (i.e., the first axis R1 and the second axis R2 are located on the plane), and the first electronic module 200 and the plane have an angle Θ (as shown in FIG. 1) within a range of 30-60 degrees. The angle Θ in the present embodiment is substantially at 45 degrees.

The first electronic module 200 includes an airflow guiding protector 201 covering the fixing shaft 1, the moving shaft 2, and the torsion structure 4. The airflow guiding protector 201 has a first flat segment 2011 arranged adjacent to the fixing shaft 1, a second flat segment 2012 arranged adjacent to the moving shaft 2, and a curved segment 2013 connected to the first flat segment 2011 and the second flat segment 2012.

Specifically, a first projecting line defined by orthogonally projecting the first axis R1 onto the first flat segment 2011 is located at a boundary between the first flat segment 2011 and the curved segment 2013. A second projecting line defined by orthogonally projecting the second axis R2 onto the second flat segment 2012 is located at a boundary between the second flat segment 2012 and the curved segment 2013. Moreover, the curved segment 2013 has a first arc-shaped segment 2013*a* and a second arc-shaped segment 2013*b* that is connected to the first arc-shaped segment 2013*a*. A radius of the first arc-shaped segment 2013*a* is smaller than that of the second arc-shaped segment 2013*b*. The first arc-shaped segment 2013*a* is also connected to the first flat segment 2011. The second arc-shaped segment 2013*b* is also connected to the second flat segment 2012.

In addition, a narrow side surface of the second electronic module 300 in the present embodiment can have at least one heat-dissipating hole (not shown), which is arranged adjacent to the mounting portion 52 for dissipating heat from the second electronic module 300. Moreover, a path of airflow or an exterior space of the heat-dissipating hole may affect the heat-dissipating efficiency of the second electronic module 300. Thus, the variable distance D and the shape of the airflow guiding protector 201, which are related to the path of airflow or the exterior space of the heat-dissipating hole, may affect the heat-dissipating efficiency of the second electronic module 300, and the detailed description is disclosed as follows.

Figure 7:
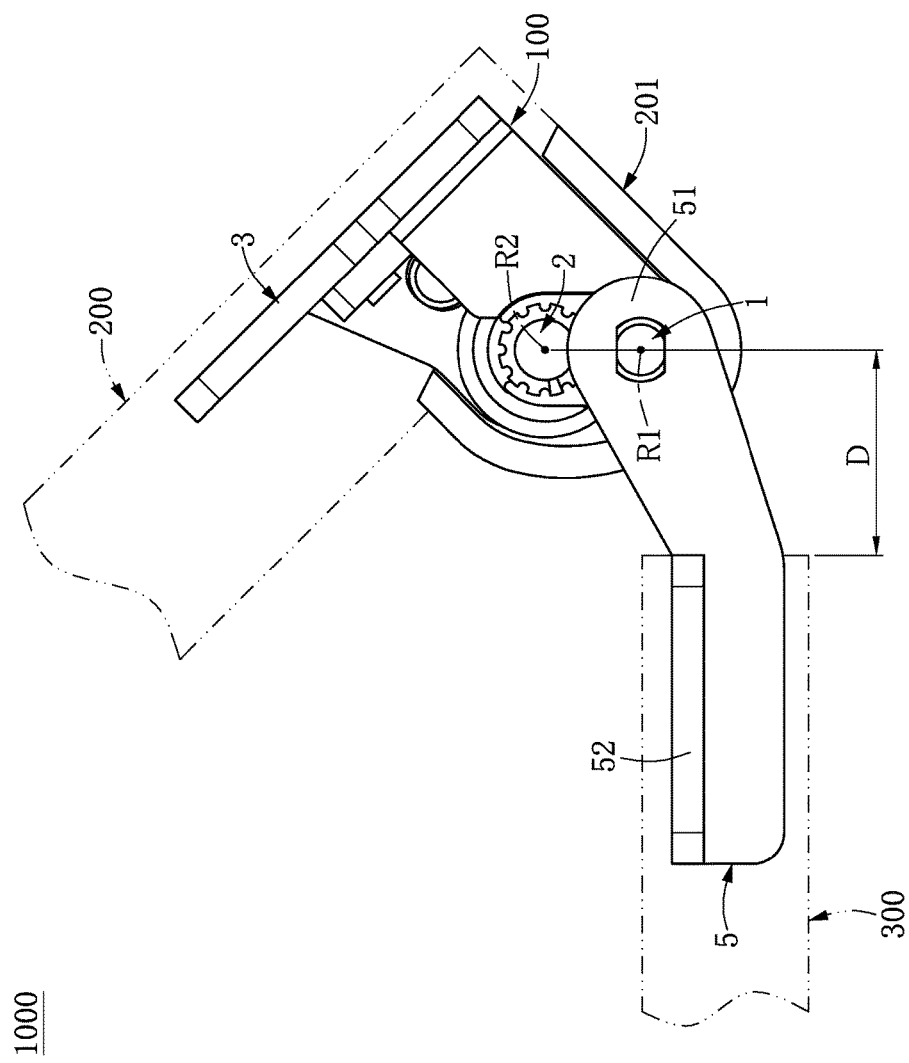
FIG. 7 is a planar view showing the clamshell-type electronic device when the first electronic module is rotated at 45 degrees relative to the second electronic module.
Figure 8:
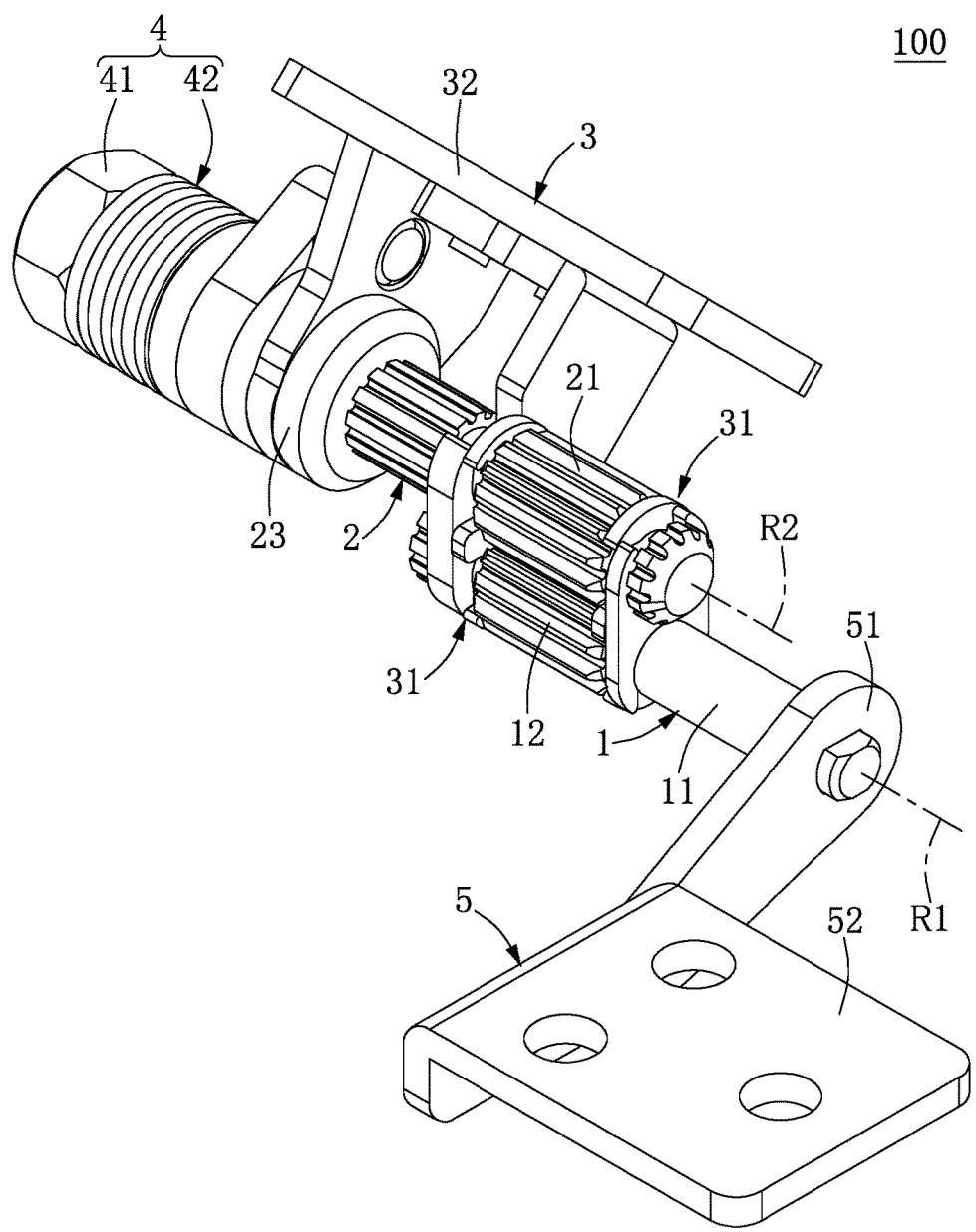
FIG. 8 is a perspective view showing the hinge module of FIG. 7.
Figure 9:
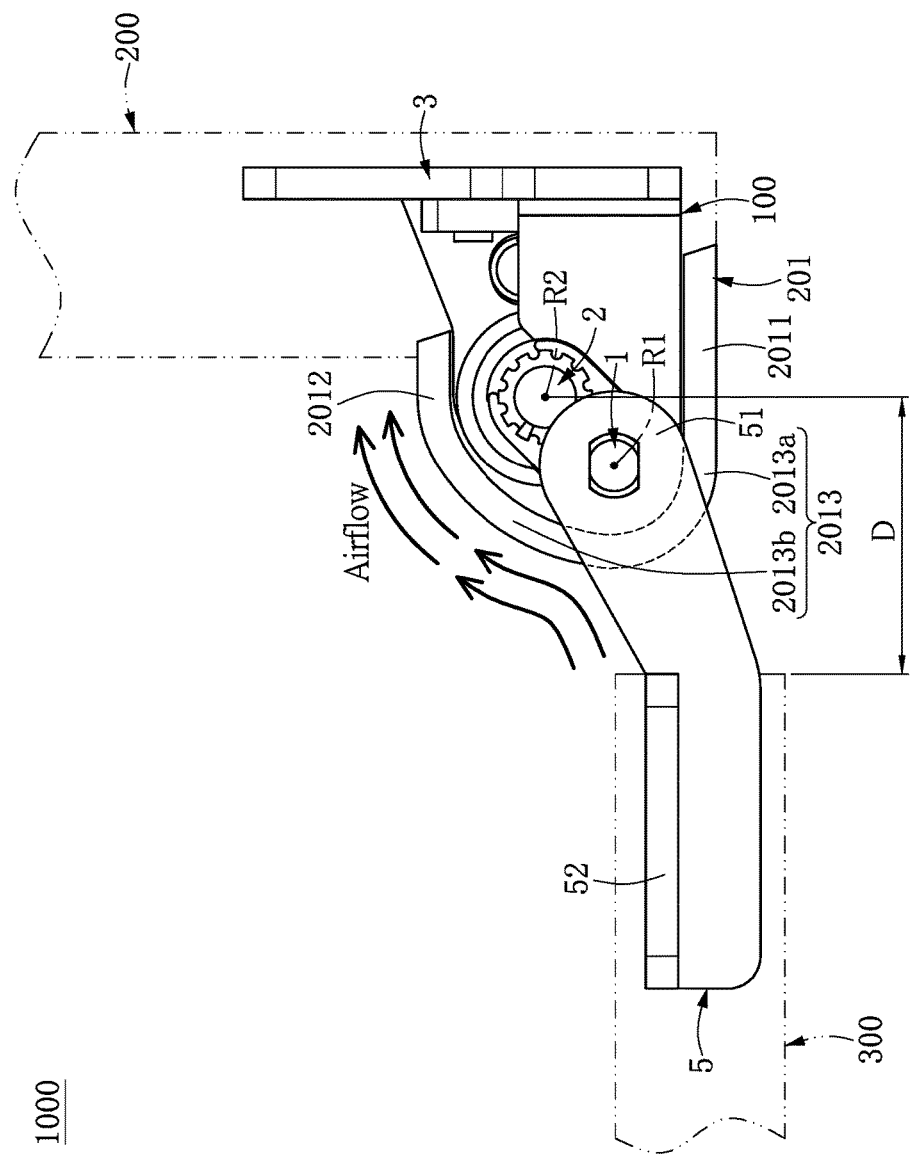
FIG. 9 is a planar view showing the clamshell-type electronic device when the first electronic module is rotated at 90 degrees relative to the second electronic module.
Figure 10:
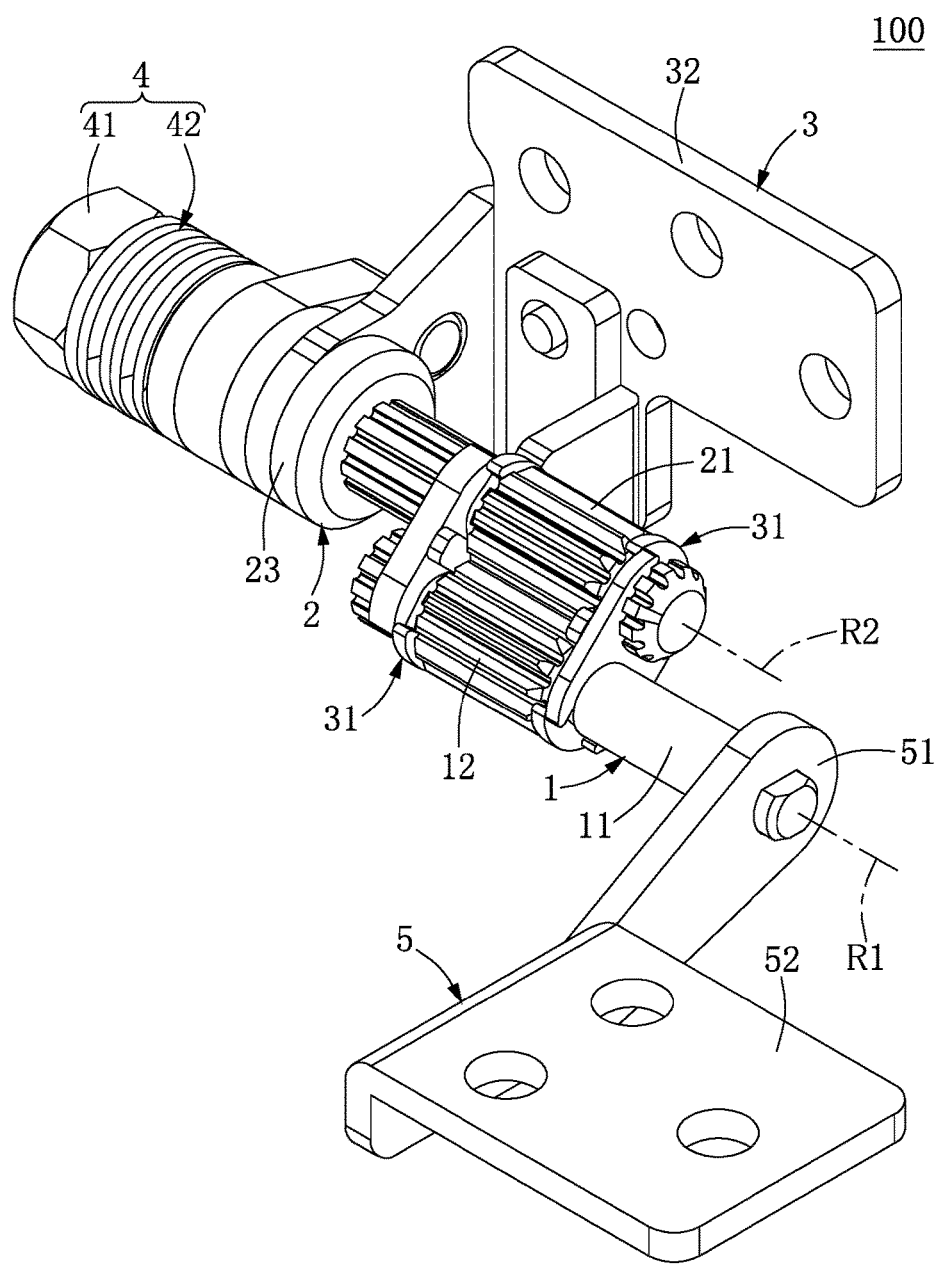
FIG. 10 is a perspective view showing the hinge module of FIG. 9.
Figure 11:
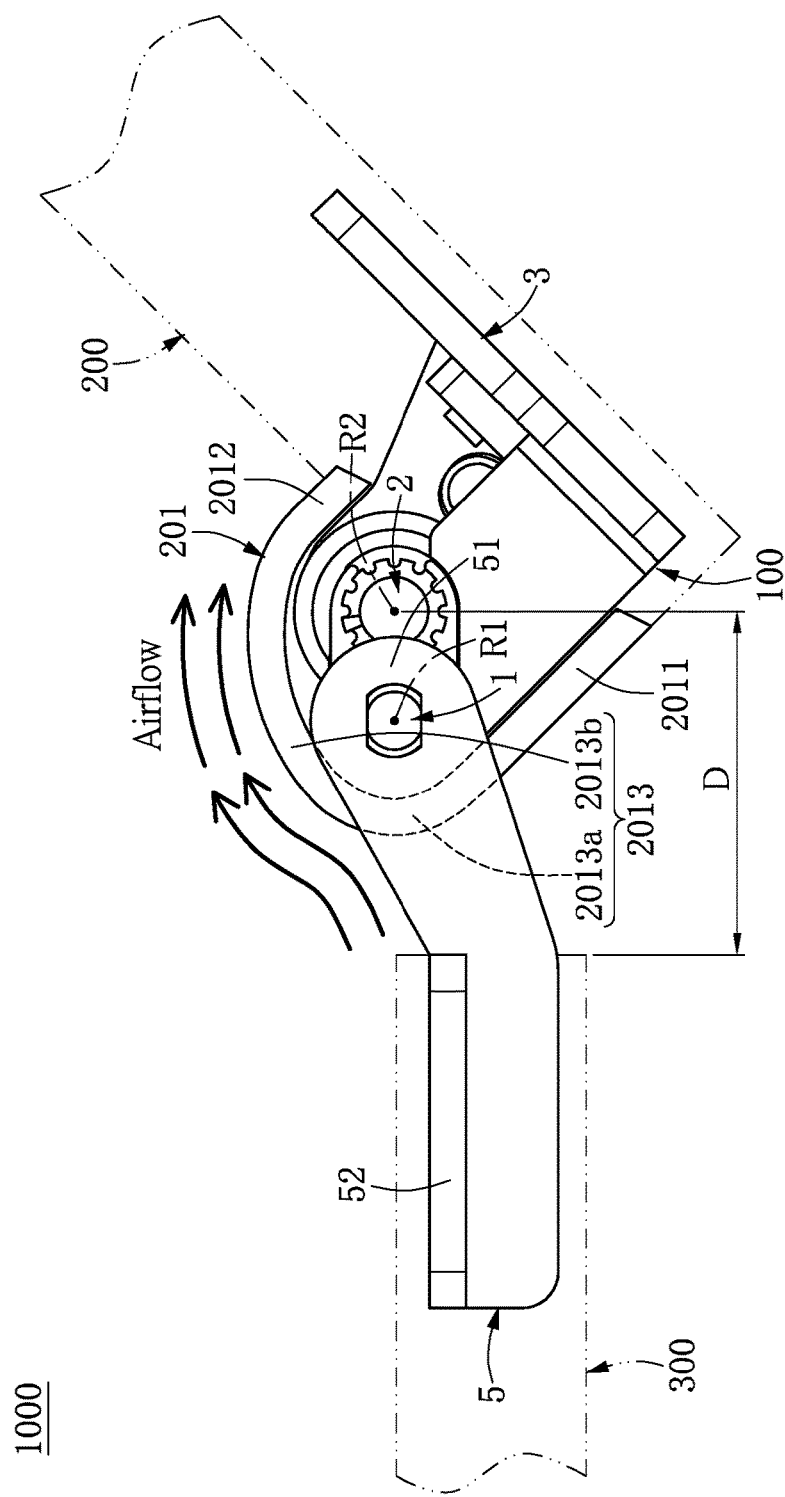
FIG. 11 is a planar view showing the clamshell-type electronic device when the first electronic module is rotated at 135 degrees relative to the second electronic module.
Figure 12:
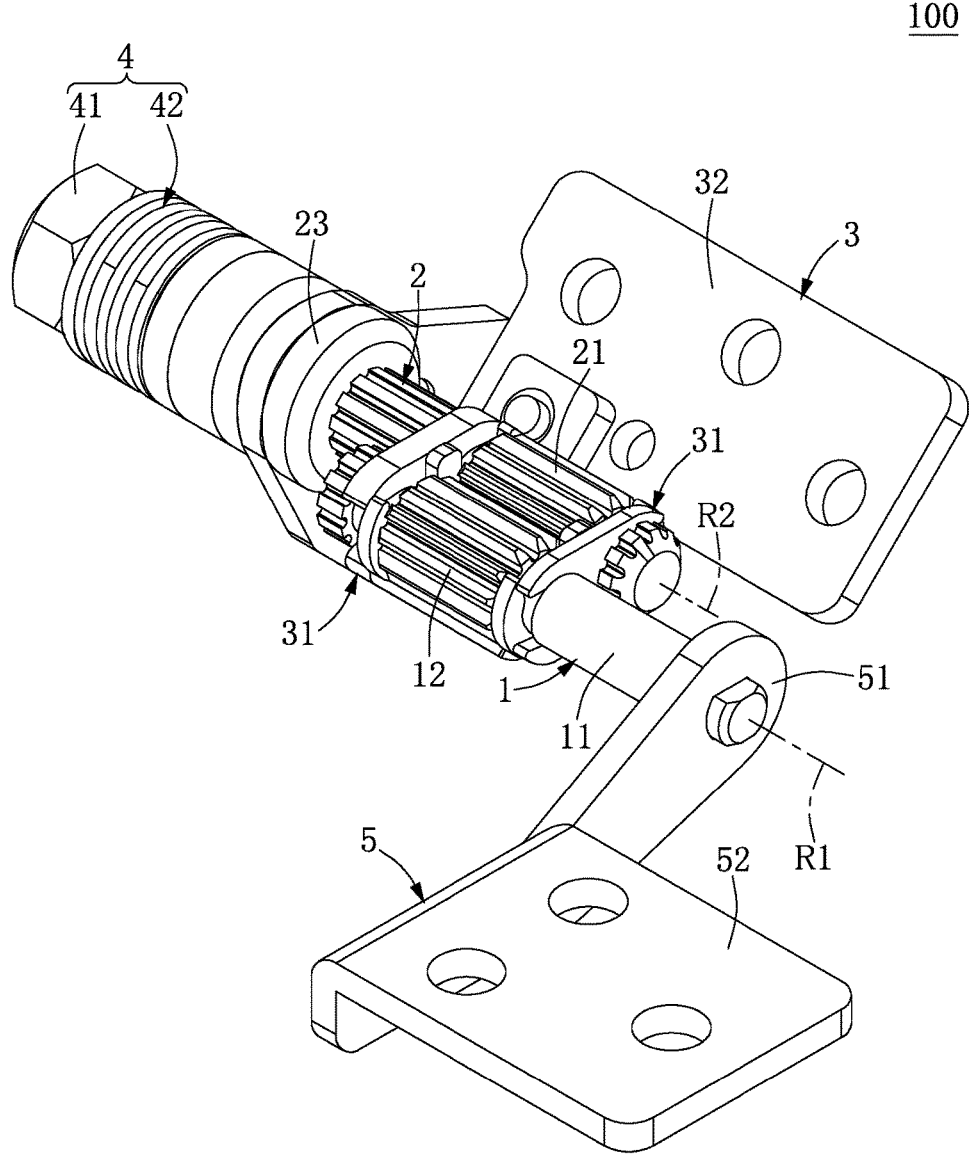
FIG. 12 is a perspective view showing the hinge module of FIG. 11.
Figure 13:
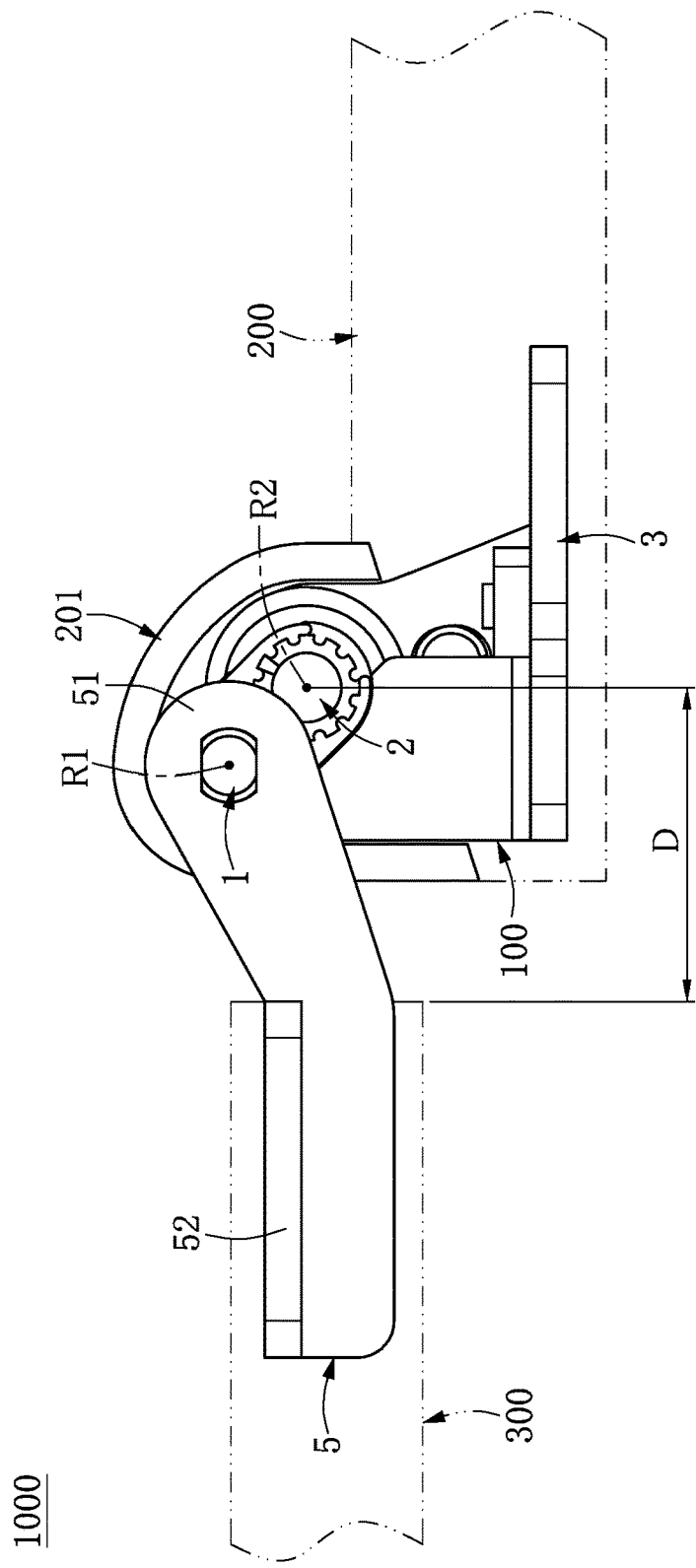
FIG. 13 is a planar view showing the clamshell-type electronic device when the first electronic module is rotated at 180 degrees relative to the second electronic module.
Figure 14:
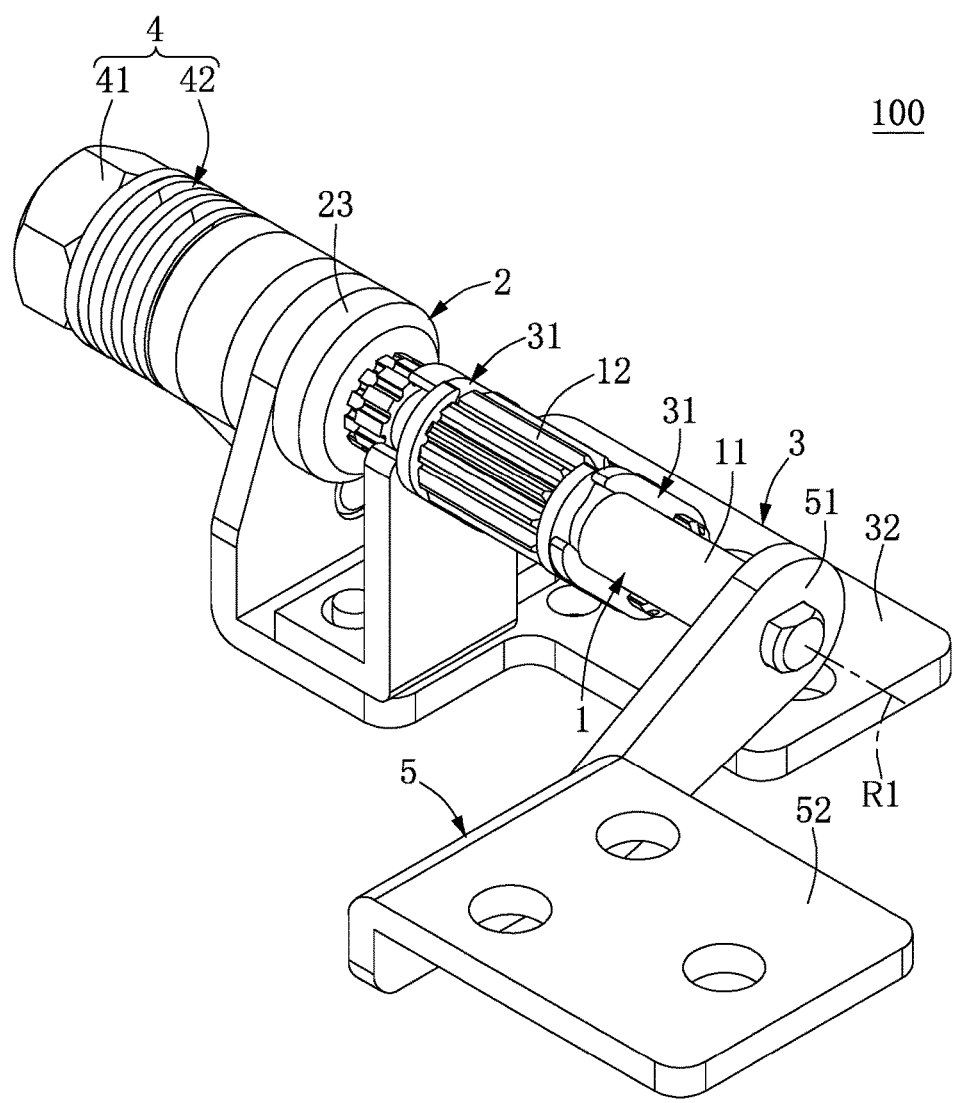
FIG. 14 is a perspective view showing the hinge module of FIG. 13.

The structure of each component of the clamshell-type electronic device 1000 has been described in the above description, and the following description discloses the connection relationships of each component of the clamshell-type electronic device 1000. Each of FIG. 1 and FIG. 2 shows that the moving shaft 2 is arranged at 0 degrees relative to the fixing shaft 1. Each of FIG. 7 and FIG. 8 shows that the moving shaft 2 is rotated at 45 degrees relative to the fixing shaft 1. Each of FIG. 9 and FIG. 10 shows that the moving shaft 2 is rotated at 90 degrees relative to the fixing shaft 1. Each of FIG. 11 and FIG. 12 shows that the moving shaft 2 is rotated at 135 degrees relative to the fixing shaft 1. Each of FIG. 13 and FIG. 14 shows that the moving shaft 2 is rotated at 180 degrees relative to the fixing shaft 1.

The first electronic module 200 is rotatable relative to the second electronic module 300 along the first axis R1 between a first position and a second position. The moving frame 3 is fixed on the first electronic module 200, so that the moving frame 3, the moving shaft 2, and the torsion structure 4 are rotatable between the first position and the second position in synchronism with the first electronic module 200. In the present embodiment, when the first electronic module 200 is at the first position (as shown in FIG. 1), the first electronic module 200 is located adjacent to and faces the second electronic module 300. Any position, that the first electronic module 200 is rotated from the first position to, can be defined as the second position (as shown in FIG. 7, 9, 11, or 13).

Specifically, when the first electronic module 200 is rotated from the first position to the second position, the moving shaft 2 is rotated along the first axis R1 by a first angle and is synchronously spun along the second axis R2 by a second angle. The first angle in the present embodiment is equal to the second angle. The variable distance D corresponding to the mounting portion 52 at the second position (as shown in FIG. 7, 9, 11, or 13) is larger than that corresponding to the mounting portion 52 at the first position (as shown in FIG. 1).

Thus, when the clamshell-type electronic device 1000 is in an operation mode, the first electronic module 200 is always at the second position to have the larger variable distance D, so that the exterior space of the heat-dissipating hole of the second electronic module 300 becomes large for quickly dissipating heat. Moreover, when the first electronic module 200 is at the second position as shown in FIG. 9 or FIG. 11, the curved segment 2013 of the airflow guiding protector 201 can establish a smooth path of airflow located at the outside of the heat-dissipating hole of the second electronic module 200, so that the heat leaving from the heat-dissipating hole can be quickly dissipated by flowing in the smooth path.

In summary, the clamshell-type electronic device 1000 (or the dual-axis hinge module 100) in the present disclosure adapts the torsion structure 4 to be arranged in the first electronic module 200 only, so that the structure design of the second electronic module 300 is not limited to the torsion structure 4. Moreover, the distance between the second axis R2 and the mounting portion 52 at the second position is larger than that between the second axis R2 and the mounting portion 52 at the first position, so that the second electronic module 300, which has the heat-dissipating hole arranged adjacent to the mounting portion 52, can be provided with a good heat-dissipating efficiency.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:
1. A clamshell-type electronic device, comprising:
    a dual-axis hinge module including:
        a fixing shaft defining a first axis and having a first mating segment, wherein no torsion structure is disposed on the fixing shaft;
        a moving shaft defining a second axis parallel to the first axis, wherein the moving shaft has a gear-shaped segment and a fastening segment, and the gear-shaped segment is engaged with the mating segment of the fixing shaft;
        a moving frame fastened to the fixing shaft and the moving shaft;
        a torsion structure fixed on the fastening segment of the moving shaft, wherein the torsion structure is configured to provide torque when the moving shaft is spun along the second axis; and
        a fixing frame having a connecting portion and a mounting portion, wherein the fixing shaft is fixed on the connecting portion of the fixing frame; and
    a first electronic module and a second electronic module both electrically connected to each other, wherein the moving frame is fixed on the first electronic module, the mounting portion of the fixing frame is fixed on the second electronic module, and the first electronic module is rotatable relative to the second electronic module along the first axis between a first position and a second position, wherein when the first electronic module is at the first position, the first electronic module is located adjacent to and faces the second electronic module, wherein when the first electronic module is rotated from the first position to the second position, the moving shaft is rotated along the first axis and is synchronously spun along the second axis, wherein a distance between the second axis and the mounting portion is variable and is defined as a variable distance, and the variable distance at the second position is larger than that at the first position.

2. The clamshell-type electronic device as claimed in claim 1, wherein the moving shaft has a blocking segment arranged between the gear-shaped segment and the fastening segment, an outer diameter of the blocking segment is larger than that of the fastening segment, wherein the torsion structure includes a nut and a washer assembly, the fastening segment of the moving shaft couples through the washer assembly and the nut, and the washer assembly is arranged between the nut and the blocking segment.

3. The clamshell-type electronic device as claimed in claim 1, wherein the first axis and the second axis jointly co-define a plane, and the first electronic module and the plane have an angle within a range of 30-60 degrees.

4. The clamshell-type electronic device as claimed in claim 1, wherein the first electronic module includes an airflow guiding protector covering the fixing shaft, the moving shaft, and the torsion structure, wherein the airflow guiding protector has a first flat segment arranged adjacent to the fixing shaft, a second flat segment arranged adjacent to the moving shaft, and a curved segment connected to the first flat segment and the second flat segment.

5. The clamshell-type electronic device as claimed in claim 4, wherein a first projecting line defined by orthogonally projecting the first axis onto the first flat segment is located at a boundary between the first flat segment and the curved segment, and a second projecting line defined by orthogonally projecting the second axis onto the second flat segment is located at a boundary between the second flat segment and the curved segment.

6. The clamshell-type electronic device as claimed in claim 1, wherein when the first electronic module is rotated from the first position to the second position, the moving shaft is rotated along the first axis by a first angle and is synchronously spun along the second axis by a second angle, and the first angle is equal to the second angle.

7. The clamshell-type electronic device as claimed in claim 1, wherein the first electronic module is a display module, and the second electronic module is a keyboard module.

8. A dual-axis hinge module of a clamshell-type electronic device, comprising:
 a fixing shaft defining a first axis and having a first mating segment, wherein no torsion structure is disposed on the fixing shaft;
 a moving shaft defining a second axis parallel to the first axis, wherein the moving shaft has a gear-shaped segment and a fastening segment, and the gear-shaped segment is engaged with the mating segment of the fixing shaft;
 a moving frame fastened to the fixing shaft and the moving shaft;
 a torsion structure fixed on the fastening segment of the moving shaft, wherein the torsion structure is configured to provide torque when the moving shaft is spun along the second axis; and
 a fixing frame having a connecting portion and a mounting portion, wherein the fixing shaft is fixed on the connecting portion of the fixing frame,
 wherein the rotating shaft is rotatable relative to the fixing shaft along the first axis between a first position and a second position, and when the rotating shaft is rotated along the first axis, the rotating shaft is synchronously spun along the second axis, wherein a distance between the second axis and the mounting portion is variable and is defined as a variable distance, and the variable distance at the second position is larger than that at the first position.

9. The dual-axis hinge module of the clamshell-type electronic device as claimed in claim 8, wherein the moving shaft has a blocking segment arranged between the gear-shaped segment and the fastening segment, an outer diameter of the blocking segment is larger than that of the fastening segment, wherein the torsion structure includes a nut and a washer assembly, the fastening segment of the moving shaft couples through the washer assembly and the nut, and the washer assembly is arranged between the nut and the blocking segment.

10. The dual-axis hinge module of the clamshell-type electronic device as claimed in claim 8, wherein when the moving shaft is rotated along the first axis by a first angle and is synchronously spun along the second axis by a second angle, the first angle is equal to the second angle.

\* \* \* \* \*